Dec. 18, 1934.  P. L. WEIRTZ  1,985,125
MEAT SCORING MACHINE
Filed May 7, 1932  2 Sheets-Sheet 1
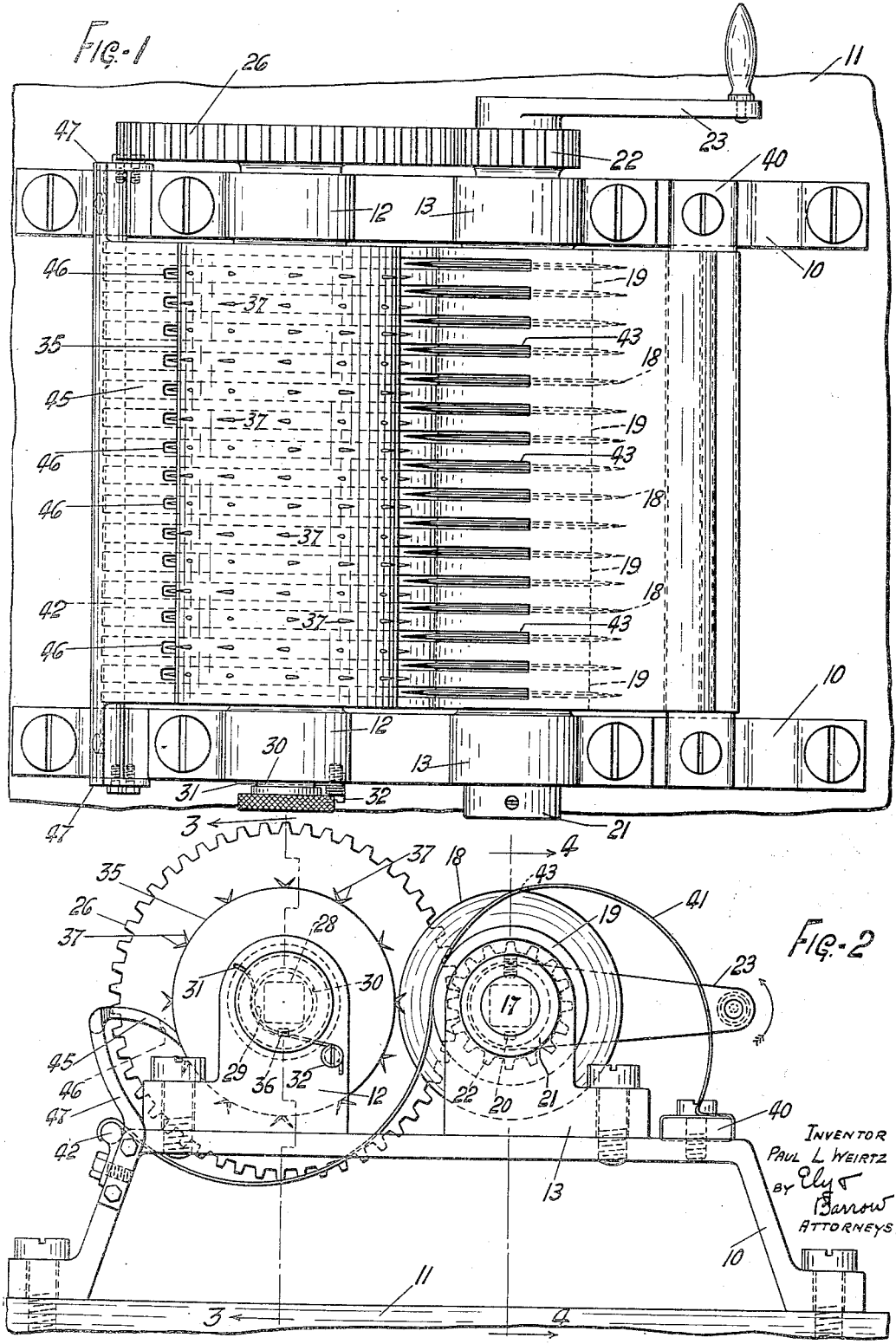

Dec. 18, 1934.    P. L. WEIRTZ    1,985,125
MEAT SCORING MACHINE
Filed May 7, 1932    2 Sheets-Sheet 2

INVENTOR
PAUL L. WEIRTZ
BY Ely & Barrow
ATTORNEYS

Patented Dec. 18, 1934

1,985,125

UNITED STATES PATENT OFFICE 1,985,125

MEAT SCORING MACHINE

Paul L. Weirtz, Akron, Ohio

Application May 7, 1932, Serial No. 609,896

4 Claims. (Cl. 17—26)

This invention relates to meat scoring machines such as are used in the preparation of "cubed steaks," and the chief objects of the invention are to provide a machine of the character mentioned that will be simple in construction and operation; that may be manufactured at small cost; that will not be large and cumbersome even when adapted for cubing large steaks; that may be easily cleaned and kept in sanitary condition; and that will require but little upkeep expense.

Of the accompanying drawings,

Figure 1 is a plan view of a machine embodying the invention in its preferred form;

Figure 2 is a side elevation thereof as viewed from the near side of Figure 1;

Figure 3:
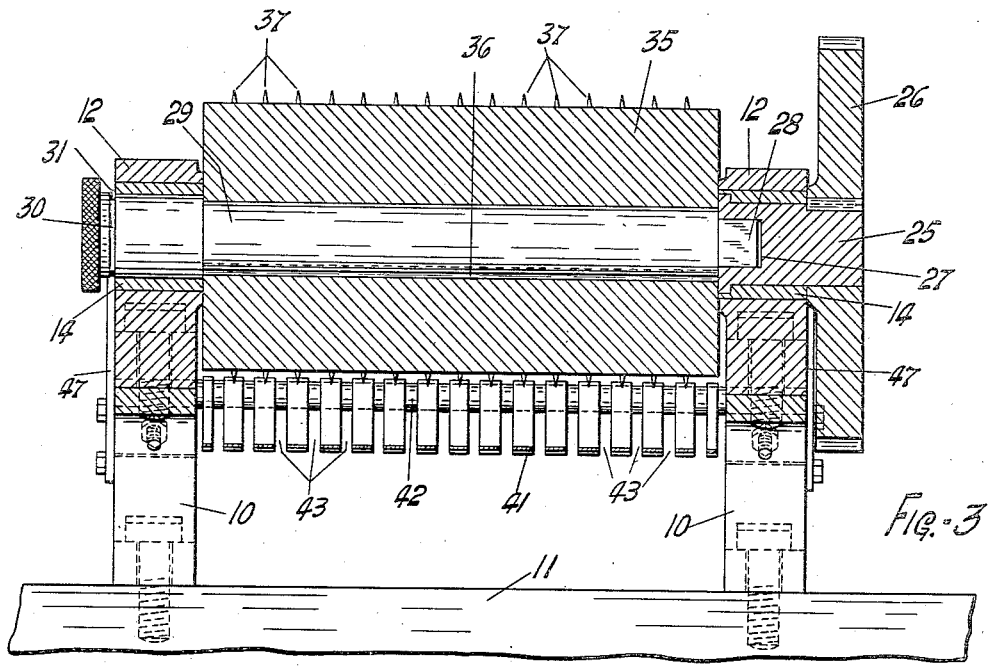
Figure 3 is a section on the line 3—3 of Figure 2.
Figure 4:
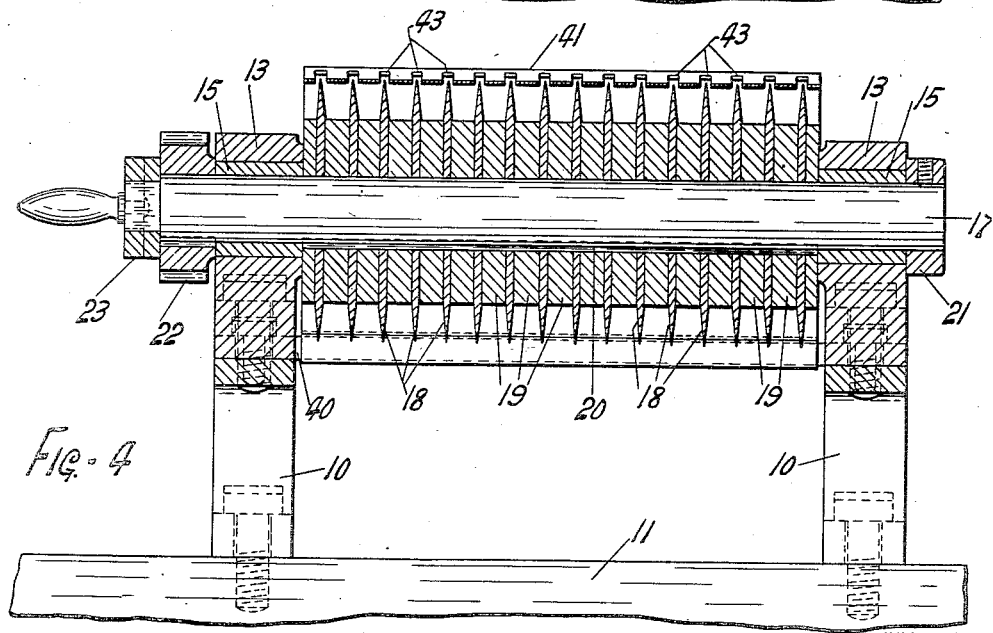
Figure 4 is a section on the line 4—4 of Figure 2.

Referring now to the drawings, 10, 10 are a pair of parallel, spaced apart, frame members that may be secured to a base-board, counter or the like indicated at 11. Mounted upon the top of each frame member 10 are a bearing bracket 12, and a bearing bracket 13, the bearings of the brackets 12, 12 being axially aligned and also the bearings of the brackets 13. The bearing brackets 12, 13 preferably comprise bearing bushings 14, 15 respectively of wood impregnated with a suitable lubricant so that the use of oil for lubrication is avoided.

Journaled in the bearings 15 is a shaft 17 upon which is mounted, between said bearings, a series of laterally spaced apart disc knives 18, 18, and spacer collars or washers 19, 19 between said knives, the latter and the spacer collars being secured to the shaft by a key or feather 20. The end portions of the shaft 17 extend beyond the brackets 13, and one end portion carries a retaining collar 21, and the other end portion carries a pinion 22 and a hand-crank 23, the pinion being keyed to the shaft and the hand crank being pinned or otherwise suitably connected thereto.

Journaled in the bearing 14 that is at the same end of the machine as the pinion 22 is a stub shaft 25 that projects outwardly from said bearing and has keyed thereon a gear 26 that is meshed with the pinion 22. The inner end of the stub shaft 25 is axially formed with a square socket 27 that receives the complementally shaped end portion 28 of a shaft 29 that is journaled in the other bearing 14. Exteriorly of the bearing 14, the shaft 29 is formed with a peripheral groove 30, and engaging the latter is an arcuate spring 31 that has one end secured to a screw or stud 32 projecting from the bracket 12 and has its other end arranged to be grasped for lifting it from the groove 30. The arrangement is such as normally to hold the shaft 29 securely in its bearing, but permitting it readily to be removed therefrom, upon occasion.

Mounted upon the shaft 29, between the brackets 12, is a feed roller or work support 35 for feeding the work past the disc knives 18, the feed roller being secured to shaft 29 by a key 36. Projecting from the surface of the feed roller are a multiplicity of sharpened prongs or pins 37, 37 that are arranged in parallel rows circumferentially of the roller, said rows being disposed in alignment with the spacer collars 19 between the disc knives 18. The prongs 37 are not normal to the surface of the feed roller 35 but are disposed at angle thereto, the inclination being in the plane of the row of prongs, and being opposite in direction in adjacent rows of prongs. The feed roller 25 and the disc knives 18 are substantially of the same diameter, and there is a small clearance between their perimeters (about one-sixteenth inch) so that a piece of meat passing therebetween is deeply scored but not severed.

Connecting the frame members 10 behind the brackets 13 is a support-bar 40 that supports one end of a knife guard and work guide 41, the other end of said guard being supported upon a rod 42 that is supported by the frame members 10, below and in front of the feed roller 35. The knife guard and work guide has the shape of a reverse curve, and extends over the disc knives, between the latter and the feed roller, and under the feed roller. It is formed with a plurality of slots 43, 43 through which the knives 18 extend, adjacent the feed roller, so that the guard does not interfere with the scoring of the meat. The slots 43 extend to that end of the guard that is hooked over the rod 42, the arrangement permitting the guard to be removed from the machine without disturbing the feed roller or the disc knives.

At the delivery side of the feed roller 35 is a scraper or work removing device that removes the meat from said roller. The scraper consists of a plate 45 that is positioned in contact with the surface of said roller, substantially tangentially thereof, and the scraping edge of the plate is formed with a series of notches 46, 46 to permit the prongs 37 to pass thereunder.

The plate 45 is supported by bracket arms 47, 47 at its respective ends, said bracket arms being secured to the respective frame members 10. The provision of the scraper 45 makes it unnecessary for the operator to pull the work from the feed roller, and thus the possibility of scratched fingers is avoided.

In the operation of the machine, the operator places a piece of meat of proper size upon the feed roller 35, pressing it thereonto so that the prongs 37 penetrate into it. Then by turning the hand crank 23 in the direction indicated by the arrow in Figure 2, the feed roller is caused to rotate to carry the work toward the knives 18, and the latter are rotated, faster than the feed of the work, so as to cut the same as they come into contact with it. With the gears 22, 26 shown there is a speed ratio of 3 to 1 between the disc knives and the feed roller, but this ratio can be changed if desired. During the cutting operation the rearwardly directed prongs 37 prevent the work being pulled forward on the feed roller by the friction of the disc knives, and the guard and guide structure 41 prevents the work from following the disc knives in case the latter pull the work from the feed roller. The scored meat is delivered at the front of the machine between the guard plate 41 and the scraper 45. The operator turns the piece of meat 90 degrees, re-mounts it on the feed roller, and repeats the operation just described to score it again at right angles to the first series of cuts. This completes a cycle of operations.

The feature of the removable shaft 29 permits the feed roller easily and quickly to be removed for cleaning without disturbing its driving gear or other parts of the machine. The machine is efficient in operation and achieves the other advantages set out in the foregoing statement of objects.

Modifications may be resorted to without departing from the spirit of the invention, or the scope of the appended claims which are not limited wholly to the specific construction shown and described.

What is claimed is:

1. In a meat scoring machine, the combination of a cylindrical work support, a plurality of disc knives arranged on an axis parallel thereto, means for concurrently rotating the knives and the work support whereby work on the latter is carried past the knives, and a guard plate extending over the knives and partly around the work support, said guard plate being formed with slots to receive the knives in the region adjacent the work support and constituting means for preventing adhesion of the work to the knives and for assuring delivery of the work at a determinate position with relation to the work support.

2. In a meat scoring machine, the combination of a horizontal cylindrical work support, a plurality of disc knives arranged on an axis parallel thereto, rows of prongs on the work support for impaling work thereon, a guard plate extending over the knives and under the work support, said plate being formed with slots to receive the knives and constituting means for preventing adhesion of the work to the knives and for assuring delivery of the work at a determinate position with relation to the work support, and a scraper engaging the surface of the work support adjacent the margin of the guard plate.

3. In a meat scoring machine, the combination of a cylindrical work support, a plurality of coaxially arranged disc knives having their cutting edges disposed adjacent the work support, said work support and knife structure being disposed side by side in a horizontal plane, means for rotating said work support and knives whereby a piece of meat on the work support is carried downwardly between the latter and the knives, and means cooperating with the work support to effect delivery of the work at a point relatively remote from the knives.

4. In a meat scoring machine, the combination of a cylindrical work support, a plurality of coaxially arranged disc knives having their cutting edges adjacent the work support, said work support and knife structure being disposed side by side in the same horizontal plane, means for rotating the said work support and knives to score a piece of meat fed between the same from above, and means below the work support for retaining the work in driving relation therewith so as to deliver the work at a point laterally of the work support.

PAUL L. WEIRTZ.